(12) United States Patent
Asal et al.

(10) Patent No.: US 12,271,179 B2
(45) Date of Patent: Apr. 8, 2025

(54) METHOD FOR OPERATING AN AUTOMATION FIELD DEVICE

(71) Applicant: Endress+Hauser SE+Co. KG, Maulburg (DE)

(72) Inventors: Florian Asal, Aitern (DE); Simon Gerwig, Schopfheim (DE); Eric Schmitt, Steinsoultz (FR); Wolfgang Trunzer, Lörrach (DE); Martin Link, Merdingen (DE); Markus Bothur, Wittlingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 705 days.

(21) Appl. No.: 17/626,142

(22) PCT Filed: Jun. 18, 2020

(86) PCT No.: PCT/EP2020/066955
§ 371 (c)(1),
(2) Date: Jan. 11, 2022

(87) PCT Pub. No.: WO2021/004753
PCT Pub. Date: Jan. 14, 2021

(65) Prior Publication Data
US 2022/0276636 A1     Sep. 1, 2022

(30) Foreign Application Priority Data

Jul. 11, 2019   (DE) ..................... 10 2019 118 839.3

(51) Int. Cl.
*G05B 19/41*     (2006.01)
*G05B 19/4155*   (2006.01)

(52) U.S. Cl.
CPC .................. *G05B 19/4155* (2013.01); *G05B 2219/31229* (2013.01)

(58) Field of Classification Search
USPC ........................................................ 700/28
See application file for complete search history.

(56) References Cited

U.S. PATENT DOCUMENTS

| | | | |
|---|---|---|---|
| 2002/0097031 A1* | 7/2002 | Cook ................. | G05B 19/0423 323/273 |
| 2007/0152645 A1* | 7/2007 | Orth ....................... | G08C 19/02 323/275 |

(Continued)

FOREIGN PATENT DOCUMENTS

| | | | |
|---|---|---|---|
| CA | 2732935 A1 * | 2/2010 | |
| DE | 102005001601 A1 * | 9/2006 | |

(Continued)

*Primary Examiner* — Hien D Khuu
(74) *Attorney, Agent, or Firm* — Mark A. Logan; Endress+Hauser (USA) Holding, Inc.

(57) ABSTRACT

A method for operating an automation field device comprises connecting a two-conductor line with an input terminal of the field device; setting a minimum electrical current value at the input terminal of the field device in an initializing phase; measuring a maximum voltage value at the input terminal in the initializing phase; ascertaining a minimum supplemental power supplied to the field device at the input terminal and which is available to the field device for performing at least one supplemental functionality; and activating/switching on a supplemental module by the processing unit when the ascertained minimum supplemental power is greater than or equal to an operating power needed for operating the supplemental module, wherein by the activating/switching on of the supplemental module a corresponding supplemental functionality is performed by the field device in measurement operation.

9 Claims, 2 Drawing Sheets

(56) References Cited

U.S. PATENT DOCUMENTS

| | | | | |
|---|---|---|---|---|
| 2010/0201342 A1* | 8/2010 | Thoren | ............... | G05B 19/042 |
| | | | | 323/318 |
| 2012/0091913 A1* | 4/2012 | Arntson | ............ | G05B 19/0423 |
| | | | | 307/31 |
| 2012/0296483 A1* | 11/2012 | Seiler | .................. | H04L 12/413 |
| | | | | 700/286 |
| 2013/0162040 A1 | 6/2013 | Arntson | | |
| 2017/0353180 A1* | 12/2017 | Guo | .................... | H03K 17/725 |
| 2019/0086944 A1* | 3/2019 | Mueller | ............... | G05B 21/02 |

FOREIGN PATENT DOCUMENTS

| | | | |
|---|---|---|---|
| DE | 102005063054 A1 | | 7/2007 |
| DE | 102006046243 A1 | | 4/2008 |
| DE | 102007038061 A1 | | 2/2009 |
| DE | 102007047309 A1 | | 4/2009 |
| DE | 102010030821 A1 | * | 1/2012 |
| DE | 102013216069 A1 | * | 12/2015 |
| EP | 2098895 A1 | | 9/2009 |
| JP | 2004531790 A | * | 10/2004 |
| JP | 2015225488 A | * | 12/2015 |
| WO | WO_2010106098 A1 | * | 9/2010 |
| WO | WO_2013030053 A1 | * | 3/2013 |

\* cited by examiner

METHOD FOR OPERATING AN AUTOMATION FIELD DEVICE

CROSS-REFERENCE TO RELATED APPLICATIONS

The present application is related to and claims the priority benefit of German Patent Application No. 10 2019 118 839.3, filed on Jul. 11, 2019 and International Patent Application No. PCT/EP2020/066955, filed on Jun. 18, 2020, the entire contents of which are incorporated herein by reference.

The invention relates to a method for operating an automation field device, to an automation field device, which is adapted to perform the method, and to an automation system.

BACKGROUND

In process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Referred to as field devices are, in principle, all devices, which are applied near to a process and which deliver, or process, process relevant information.

A large number of such field devices are produced and sold by the firm, Endress+Hauser.

Currently in many existing automated plants, so-called two conductor field devices are still being used. Such are connected via a two-conductor line, i.e. a line with two separately formed electrical current carrying paths, to a superordinated unit, for example, a controller (PLC), or a control system. The two conductor field devices are, in such case, embodied in such a manner that the measured-, or actuating, values are communicated, i.e. transmitted, as main process variable via the two-conductor line, or the two conductor cable, in analog manner in the form of a 4-20 mA loop current or electrical current signal. In such case, a loop current of the two-conductor line is set by the field device and the superordinated unit to a specific value corresponding to the registered process variable.

For sending all other data, especially the HART protocol has proved itself, in the case of which the analog, electrical current signal of 4-20 mA is superimposed with a frequency signal as digital, two conductor signal for data transmission. The HART protocol switches between 1200 Hz and 2400 Hz for data transmission, wherein the low frequency stands for a logical "0" and the higher frequency for a logical "1". The only slowly varying analog, electrical current signal remains unaffected by the frequency superpositioning, such that analog and digital communication is united by means of the HART protocol.

Besides the data transmission, the two-conductor line serves also for supplying energy to the two-conductor field device. In such case, a field device electronics, which is connected via a connection terminal to the two-conductor line, is provided with power required for operation, power in the form of a terminal voltage, which lies across the connection terminals, and a loop current, which flows in the loop between the connection terminals.

In the case of two-conductor field devices, the provided power is, most often, already critical for operation of basic functionalities. Added to this is the fact that newer two conductor field devices offer always more functionalities. These supplemental functionalities, e.g. expanded measurement modes, data transmission per radio, etc., can, however, only be activated, when sufficient power is available to the two-conductor field device. For this reason, ascertaining and monitoring of the available power are unavoidable.

Problematic in such case is that the available power is dependent on the terminal voltage and the set electrical current, wherein an electrical current value can, in turn, change very rapidly as a function of a measured value of the process variable. Additionally, external measuring- or communication resistors, high line resistances or the like likewise affect the terminal voltage. In order, in spite of this, to be able to assure basic- and supplemental functionalities, usually provided is a circuit for rapid monitoring of the input power into the devices. With knowledge of the input power at all times, supplemental functionalities can be activated, or switched on, when, besides the power required to perform the basic functionality, extra (supplemental) power is available.

Knowledge of the currently available power means, however, also an increased system load for the field device, especially for a processing unit of the field device. Furthermore, hardware modules and electronic components are required, which have fast reaction times.

SUMMARY

An object of the invention is to provide a simpler way to activate, or switch on, a supplemental functionality as a function of available supplemental power in a two-conductor field device.

The method of the invention for operating an automation field device, which is adapted to register, or to set, a measurement- and/or actuating value and to transmit such via a 4-20 mA signal on a two-conductor line and in measurement operation to execute supplemental functionalities with a plurality of separately switchable, electrical, supplemental modules, includes method steps as follows:

connecting the two-conductor line with an input terminal of the field device, in order to connect the field device with an external voltage source;

setting a minimum electrical current value at the input terminal of the field device by an electrical current controller of the field device in an initializing phase;

measuring a maximum voltage value at the input terminal by a voltage measuring unit of the field device in the initializing phase, wherein the maximum voltage value is measured at set minimum electrical current value;

ascertaining by a processing unit, especially a microprocessor, of the field device a minimum supplemental power, which is supplied to the field device at the input terminal and which is available to the field device for performing at least one supplemental functionality, wherein the ascertaining of the minimum supplemental power (Psupp) is performed based at least on the maximum voltage value ($U_{Tmax}$) measured at set minimum electrical current value;

activating/switching on a supplemental module of the plurality of supplemental modules by the processing unit, when the ascertained minimum supplemental power is greater than or equal to an operating power needed for operating the supplemental module, wherein by the activating/switching on of the supplemental module a corresponding supplemental functionality is performed by the field device in measurement operation.

The invention proceeds from the idea that the field device in the initializing phase starts, for SIL-reasons, with a minimum electrical current value (Fail Low), which lies below an electrical current value representing a measured value. For example, the minimum electrical current value can be less than or equal to 3.6 mA. Furthermore, the invention proceeds from the idea that an increase of the electrical current value by, for example, 1 mA represents significantly more input power for the field device than an increase of the voltage value at the input terminal by, for example, 1 V. This is justified to the extent that such assumptions can be metrologically verified. Thus, it can be shown that there is available to the field device a supplemental power of about 3 mW in the case of an increase of the voltage value at the input terminal of 1 V and a supplemental power of about 8.5 mW in the case of an increase of the electrical current value of 1 mA. Likewise it could be metrologically shown that the increasing of the electrical current value affects a voltage value at the input terminal negatively only after a total resistance significantly greater than 2.5 kiloohm. Since an external total resistance of greater than 2.5 kiloohm lies outside of established standards and/or specifications, such case can be excluded in practical applications.

An advantageous form of embodiment of the method of the invention provides that when, minus the operating power already required for operating the activated/switched on, supplemental module, still sufficient power of the ascertained supplemental power is available, then others of the plurality of supplemental modules are activated/switched on.

Another advantageous form of embodiment of the method of the invention provides that each supplemental module has a specific operating power.

Another advantageous form of embodiment of the method of the invention provides that the operating power required for operating a supplemental module is stored in the field device, especially in the processing unit or a memory element.

Another advantageous form of embodiment of the method of the invention provides that a sequence, in which the supplemental modules are activated/switched on upon sufficient power, is fixedly predetermined.

Another advantageous form of embodiment of the method of the invention provides, furthermore, method steps as follows:
 establishing the minimum electrical current value at the input terminal of the field device by the electrical current controller of the field device in measurement operation;
 measuring a maximum voltage value in measurement operation at the input terminal by the voltage measuring unit of the field device, wherein the maximum voltage value is measured at the minimum electrical current value set in measurement operation;
 checking whether a change has taken place compared with the minimum electrical current value and the maximum voltage value in the initializing phase;
 signaling the change, in case such has been detected.

Another advantageous form of embodiment of the method of the invention provides that set as minimum electrical current value is a value of less than or equal to an electrical current value representing the minimum measuring- and/or actuating value.

Another advantageous form of embodiment of the method of the invention provides that the supplemental functionalities are selected from an activating of a display of the field device, an activating of a radio interface of the field device or an activating of a backlighting of a display.

The invention relates further to an automation field device adapted to perform the method according to one of the above described forms of embodiment.

The invention relates further to an automation system comprising:
 a field device as claimed in the preceding claim;
 an external voltage source;
 a two-conductor line, via which the external voltage source is connected with the input terminal of the field device,
 wherein an external total resistance of an external circuitry of the field device, including at least the external voltage source and the two-conductor line, is less than or equal to 2.5 kiloohm, wherein the external total resistance comprises at least one internal resistance of the voltage source and a line resistance of the two-conductor line.

BRIEF DESCRIPTION OF THE DRAWINGS

The invention will now be explained in greater detail based on the appended drawing, the figures of which show as follows.

DETAILED DESCRIPTION

Figure 1:
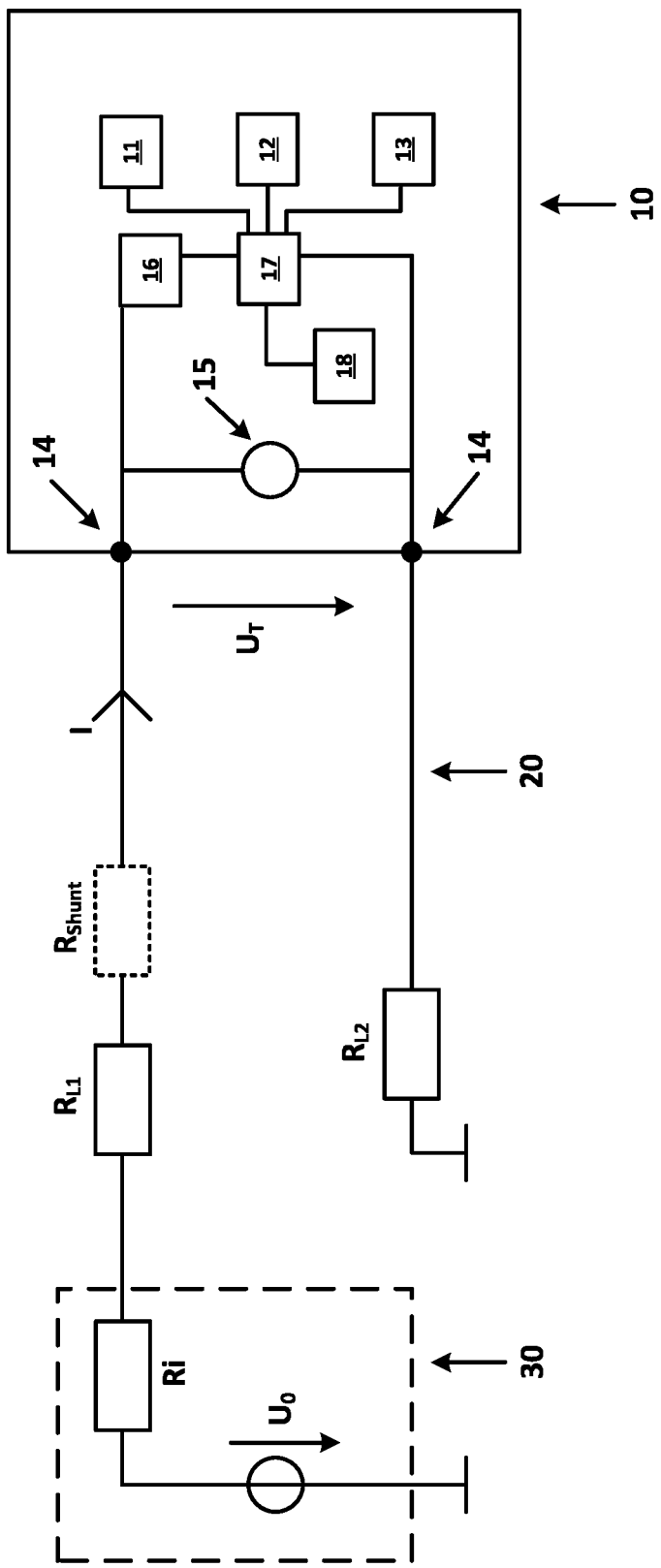
FIG. 1 shows an automation system composed of a voltage source, an automation field device and a two-conductor line, which connects the voltage source and the field device with one another.
Figure 3:
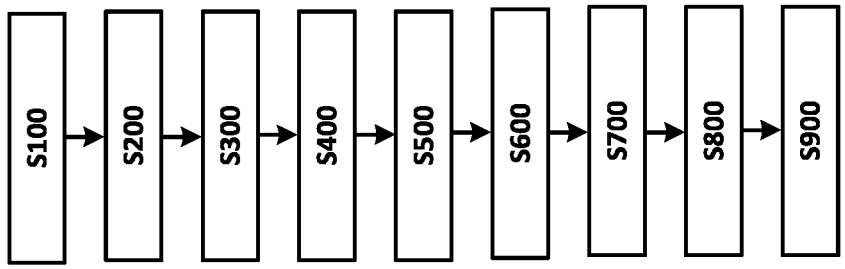
FIG. 3 shows a schematic process flow diagram of the method of the present disclosure.

FIG. 1 shows an automation system composed of a voltage source, an automation field device and a two-conductor line, which connects the voltage source and the field device with one another.

Field device 10 includes an input terminal 14, to which the two-conductor line 20 is connected, an electrical current controller 15 for setting an electrical current value I, a voltage measuring unit for registering a terminal voltage UT at the input terminal 14, and a processing unit 17, for example, a microprocessor, for control and/or evaluation.

Input terminal 14 and, thus, field device 10 are connected with a voltage source via the two-conductor line 20. Field device 10 is supplied with energy by the voltage source 30 via the two-conductor line 20. For this, the field device is provided with an operating power as a function of terminal voltage UT, which lies on the connection terminal 14, and the electrical current I, which flows through the two-conductor line. Furthermore, measuring- and/or actuating values are transmitted via the two-conductor line, for example, to a superordinated unit, especially a PLC. In such case, an electrical current value between 4 mA and 20 mA represents a corresponding measuring- and/or actuating value. In such case, an electrical current value of 4 mA (Imin, meas) represents a minimum measuring- and/or actuating value and 20 mA a maximum measuring and/or actuating value (Imax, meas). Due to drift and inaccuracies as well as the detecting of range overflows, usually a somewhat greater range of 3.8 ... 20.5 mA is permitted for the representation of the variables. Electrical current values of less than 3.6 mA and greater than 21 mA should no longer serve as representation of the measuring- and/or actuating value for the superordinated unit, but, instead, as failure information of the field device.

Furthermore, the field device 10 includes one or more supplemental modules 11, 12, 13, each of which is adapted to execute a supplemental functionality. The supplemental modules 11, 12, 13 are separately activatable. For example, the supplemental modules 11, 12, 13 can be activated by the processing unit 17. By the activating of a supplemental module, a supplemental functionality is performed in the field device 10, a functionality not present in the basic functionality of the field device 10. The basic functionality comprises, in such case, the pure measuring and/or setting of the process variable. Supplemental functionalities can be, for example: the activating of a display in the field device 11, the activating of a radio interface 12, for example, a radio interface according to a Bluetooth standard, especially Bluetooth Low Energy and/or the activating of a backlighting 13.

The activating of the separate supplemental modules is performed by the processing unit and depends on whether a supplemental power necessary for operating the corresponding supplemental module is present for the supplemental module.

For this, according to the invention, a minimum supplemental power Psupp is ascertained, which is provided to the field device 10 at the input terminal 14 and which is always available to the field device for performing at least one supplemental functionality in measurement operation. In other words, that supplemental power is ascertained, which in a worst-case scenario in measurement operation is nevertheless always to be available for operating a supplemental module 11, 12, 13. The ascertaining of the minimum available supplemental power ("worst-case power") Psupp is performed in the initializing phase of the field device 10. In the initializing phase, there is, and must be for SIL-reasons, a failure electrical current value of less than or equal to 3.6 mA (I<3.6 mA) set by the electrical current controller 15 of the field device 10. This failure electrical current value corresponds to the minimum possible electrical current value Imin and a maximum voltage value $U_{Tmax}$ appropriate therefor can be measured by the voltage measuring unit 16. The minimum electrical current value Imin and the maximum voltage value $U_{Tmax}$ result in a minimum input power Pmin, which is always available to the field device at the input terminal 14 in measurement operation, since an increase of the electrical current value by, for example, 1 mA represents significantly more input power to the field device than an increase of the voltage value at the input terminal by, for example, 1 V.

Figure 2:
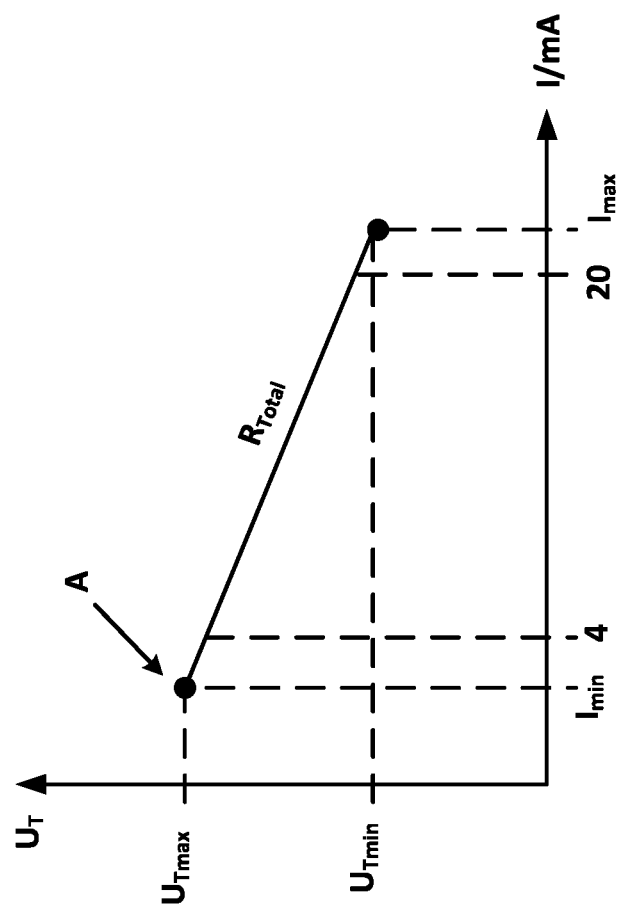
FIG. 2 shows a voltage versus current characteristic line, in which voltage values versus electrical current values are registered at the input terminal of the field device.

FIG. 2 represents, by way of example, a typical voltage versus electrical current, characteristic line, in which voltage values are registered versus electrical current values at the input terminal 14 of the field device. Likewise shown in FIG. 2 is the point A, which designates the minimum electrical current value Imin and the maximum voltage value $U_{Tmax}$ at initializing of the field device 10. Evident from FIG. 2 is the 4-20 mA range, in which the field device 10 transmits the measuring- and/or actuating value in measurement operation, i.e. after the initializing phase. Likewise, evident is the total resistance $R_{total}$ of the system composed of field device 10, two-conductor line 20 and external voltage source 30. The total resistance $R_{total}$ includes, in such case, first and second line resistances $R_{L1}$, $R_{L2}$ of the two-conductor line, an internal resistance Ri of the voltage source and optionally a measurement-, or communication, resistance $R_{shunt}$, which can be introduced into the two-conductor line. Such a measurement-, or communication, resistance $R_{shunt}$ can have a resistance value of about 150-600 ohm, preferably about 200-500 ohm, especially preferably about 220-500 ohm.

As described above, the increasing of the electrical current value acts negatively on the voltage value at the input terminal only above an external total resistance significantly greater than 2.5 kiloohm. Since this case, however, never happens, the minimum input power can be ascertained based on the maximum voltage value at the minimum electrical current value.

For ascertaining the minimum available supplemental power Psupp, the processing unit 17 can form a difference between the maximum voltage value $U_{Tmax}$ and a minimum terminal voltage specifically predetermined for the field device. The difference gives an "additional" input voltage Uadd. The "additional" input voltage Uadd can be multiplied with a device factor specific for the particular field device to yield a minimum supplemental power Psupp available to the field device. The device factor can be, for example, a mathematically and/or metrologically ascertained value. Such is, as a rule, different from field device to field device. The device factor can be a voltage dependent value with the units mW/V, which gives a power increase per unit of voltage. For example, the voltage dependent device factor can be about 3.4 mW/V. Alternatively, the device factor can be an electrical current dependent value with the units mW/A, which gives a power increase per unit of electrical current. For example, the electrical current dependent device factor can be about 8.7 mW/A.

Based on the ascertained supplemental power Psupp, the processing unit 17 can activate one or more supplemental modules 11, 12, 13, when the provided supplemental power Psupp is greater than or equal to an operating power P11, P12, P13 necessary for operating the corresponding supplemental module. The supplemental modules 11, 12, 13 can require mutually differing operational powers P11, P12, P13 for operation. The operational powers P11, P12, P13 can, for example, be stored in a memory element 18 of the field device 10, such that the processing unit 17 has access thereto. Alternatively, the operational powers P11, P12, P13 can, however, also be stored in the processing unit 17. Based on the knowledge of the operational powers P11, P12, P13, the processing unit 17 can correspondingly activate the supplemental modules 11, 12, 13 upon sufficiently provided supplemental power Psupp. The supplemental modules 11, 12, 13 can, in such case, be activated sequentially in an established sequence. The establishing of the sequence can be done by the field device manufacturer during manufacture of the field device 10.

For checking whether the system of field device 10, two-conductor line 20 and voltage source 30 has changed since the initializing phase, a renewed ascertaining of maximum voltage value $U_{Tmax}$ at minimum electrical current value Imin can occur in measurement operation.

For this, firstly, the minimum electrical current value Imin at the input terminal 14 of the field device is set during measurement operation by the electrical current controller 15 of the field device. Then, the maximum voltage value $U_{Tmax}$ at the input terminal 14 is measured by the voltage measuring unit 16 of the field device in measurement operation. Based on the measured maximum voltage value, a check can be made, whether a change has taken place compared with the minimum electrical current value Imin and the maximum voltage value $U_{Tmax}$ in the initializing phase. A detected change can then be signaled. Such changes can occur, for example, as a result of corrosion on the connection terminal.

The invention claimed is:

1. A method for operating an automation field device that is adapted to register or to set a measurement and/or actuating value and to transmit the measurement and/or actuating value via a 4-20 mA signal on a two-conductor line and is further adapted in measurement operation to execute supplemental functionalities with a plurality of separately switchable, electrical, supplemental modules, the method comprising:
    connecting the two-conductor line with an input terminal of the automation field device to connect the automation field device with an external voltage source;
    setting a minimum electrical current value at the input terminal of the automation field device by an electrical current controller of the automation field device in an initializing phase;
    measuring a maximum voltage value at the input terminal by a voltage measuring unit of the automation field device in the initializing phase, wherein the maximum voltage value is measured at the set minimum electrical current value;
    ascertaining by a processing unit of the automation field device a minimum supplemental power that is supplied to the automation field device at the input terminal and which is available to the automation field device for performing at least one supplemental functionality, wherein the ascertaining of the minimum supplemental power is performed based at least on the maximum voltage value measured at the set minimum electrical current value;
    activating/switching on a first supplemental module of the plurality of separately switchable, electrical, supplemental modules by the processing unit when the ascertained minimum supplemental power is greater than or equal to an operating power needed for operating the first supplemental module, wherein by the activating/switching on of the first supplemental module a corresponding supplemental functionality is performed by the automation field device in measurement operation;
    subtracting the operating power required for operating the first supplemental module from the ascertained supplemental power; and
    activating/switching on a second supplemental module of the plurality of separately switchable, electrical, supplemental modules when the difference between the ascertained supplemental power and the operating power required for operating the first supplemental module is greater than or equal to an operating power needed for operating the second supplemental module.

2. The method as claimed in claim 1, wherein each of the plurality of separately switchable, electrical, supplemental modules has a specific operating power.

3. The method as claimed in claim 2, wherein the specific operating power required for operating the respective supplemental module is stored in the processing unit or a memory element in the automation field device.

4. The method as claimed in claim 1, wherein a sequence in which each of the plurality of separately switchable, electrical, supplemental modules are activated/switched on upon sufficient power is fixedly predetermined.

5. The method as claimed in claim 1, further comprising:
    establishing the minimum electrical current value at the input terminal of the automation field device by the electrical current controller of the automation field device in measurement operation;
    measuring the maximum voltage value in measurement operation at the input terminal by the voltage measuring unit of the automation field device, wherein the maximum voltage value is measured at the minimum electrical current value set in measurement operation;
    checking whether a change has taken place compared with the minimum electrical current value and the maximum voltage value in the initializing phase;
    signaling when the change has been detected.

6. The method as claimed in claim 1, wherein set as minimum electrical current value is a value of less than or equal to an electrical current value representing the minimum measuring- and/or actuating value.

7. The method as claimed in claim 1, wherein the supplemental functionalities are selected from: an activating of a display of the automation field device; an activating of a radio interface of the automation field device; and an activating of a backlighting of a display.

8. An automation field device, comprising:
    an input terminal for connecting the automation field device with a two-conductor 4-20 mA loop;
    an electrical current controller configured to regulate a 4-20 mA signal on the 4-20 mA loop;
    a voltage measuring circuit configured to measure an input voltage at the input terminal;
    a processing unit including a microprocessor and a memory; and
    a plurality of separately switchable, electrical, supplemental modules,
    wherein the automation field device is configured to:
        register or set a measurement and/or actuating value and transmit the measurement and/or actuating value via the 4-20 mA signal on the 4-20 mA loop;
        execute a plurality of supplemental functionalities with the plurality of separately switchable, electrical, supplemental modules in measurement operation;
        set a minimum electrical current value at the input terminal via the electrical current controller in an initializing phase;
        measure a maximum voltage value at the input terminal via the voltage measuring unit in the initializing phase, wherein the maximum voltage value is measured at the set minimum electrical current value;
        ascertain via the processing unit a minimum supplemental power that is supplied to the automation field device at the input terminal and which is available to the automation field device for performing a first supplemental functionality of the plurality of supplemental functionalities, wherein the ascertaining of the minimum supplemental power is performed based at least on the maximum voltage value measured at the set minimum electrical current value;
        activate/switch on a first supplemental module of the plurality of separately switchable, electrical, supplemental modules by the processing unit when the ascertained minimum supplemental power is greater than or equal to an operating power needed for operating the first supplemental module, wherein by the activating/switching on of the first supplemental module the corresponding first supplemental functionality is performed by the automation field device in measurement operation;
        subtracting the operating power required for operating the first supplemental module from the ascertained supplemental power; and activating/switching on a second supplemental module of the plurality of separately switchable, electrical, supplemental modules when the difference between the ascertained supplemental power and the operating power required for operating the first supplemental module is greater than or equal to an operating power needed for operating the second supplemental module.

9. An automation system, comprising:
an automation field device, including:
  an input terminal for connecting the automation field device with a two-conductor 4-20 mA loop;
  an electrical current controller configured to regulate a 4-20 mA signal on the 4-20 mA loop;
  a voltage measuring circuit configured to measure an input voltage at the input terminal;
  a processing unit including a microprocessor and a memory; and
  a plurality of separately switchable, electrical, supplemental modules,
  wherein the automation field device is configured to:
    register or set a measurement and/or actuating value and transmit the measurement and/or actuating value via the 4-20 mA signal on the 4-20 mA loop;
    execute a plurality of supplemental functionalities with the plurality of separately switchable, electrical, supplemental modules in measurement operation;
    set a minimum electrical current value at the input terminal via the electrical current controller in an initializing phase;
    measure a maximum voltage value at the input terminal via the voltage measuring unit in the initializing phase, wherein the maximum voltage value is measured at the set minimum electrical current value;
    ascertain via the processing unit a minimum supplemental power that is supplied to the automation field device at the input terminal and which is available to the automation field device for performing a first supplemental functionality of the plurality of supplemental functionalities, wherein the ascertaining of the minimum supplemental power is performed based at least on the maximum voltage value measured at the set minimum electrical current value; and
    activate/switch on a first supplemental module of the plurality of separately switchable, electrical, supplemental modules by the processing unit when the ascertained minimum supplemental power is greater than or equal to an operating power needed for operating the first supplemental module, wherein by the activating/switching on of the first supplemental module the corresponding first supplemental functionality is performed by the automation field device in measurement operation;
an external voltage source; and
the two-conductor 4-20 mA loop via which the external voltage source is connected with the input terminal of the automation field device,
wherein an external total resistance of an external circuitry of the automation field device, including at least the external voltage source and the two-conductor 4-20 mA loop, is less than or equal to 2.5 kiloohm, wherein the external total resistance includes at least one internal resistance of the external voltage source and a line resistance of the two-conductor 4-20 mA loop.

* * * * *